Jan. 22, 1929.

P. E. CHAPMAN 1,699,833

PICTURE PROJECTING APPARATUS

Original Filed July 26, 1913    2 Sheets-Sheet 1

WITNESSES

INVENTOR.

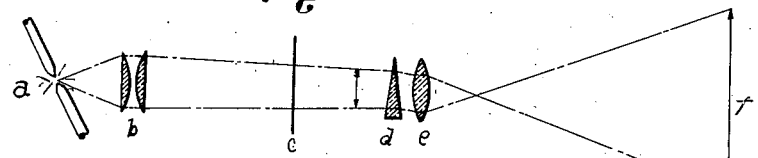
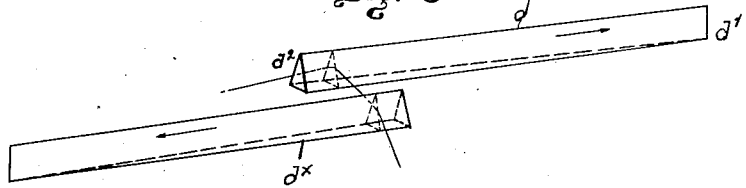
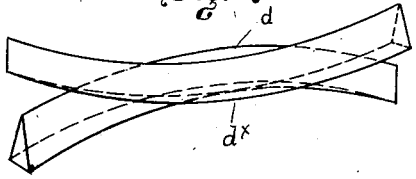
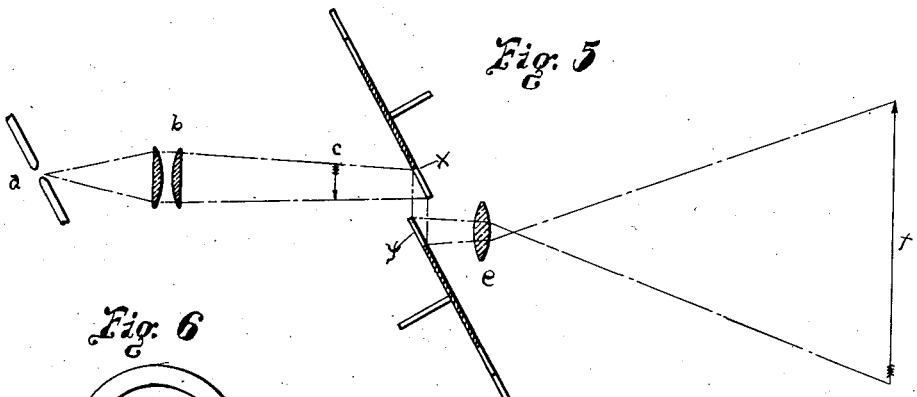
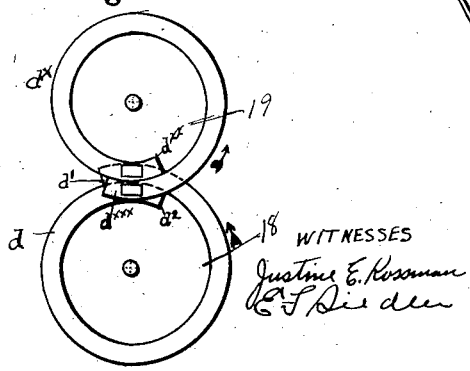

Patented Jan. 22, 1929.

1,699,833

UNITED STATES PATENT OFFICE.

PENROSE E. CHAPMAN, OF ST. LOUIS, MISSOURI, ASSIGNOR TO WALTER A. HORNER, OF CHICAGO, ILLINOIS.

PICTURE-PROJECTING APPARATUS.

Substitute for application Serial No. 781,426, filed July 26, 1913. This application filed December 4, 1919. Serial No. 342,449.

The object of my invention is for projecting what is commonly known as moving pictures, the object being to avoid the flicker of the picture on the screen. Projecting machines, as at present operated, expose a picture to view on the screen for a brief space of time after which the light is cut off and the picture advances so as to substitute the next picture in the shutter opening for exposure. This produces a flicker and although the change is rapid it is sufficiently slow to be susceptible and is to some very annoying. My present invention contemplates the projection of pictures onto a screen in which the darkening shutter is omitted with the result that the screen is continuously exposed to light.

Figure 2 is a diagrammatic illustration of one form of my invention.

Fig. 3 is a diagrammatic illustration of the prisms used in connection with my invention.

Figure 4 is a similar view showing said prisms curved edgewise.

Figure 5 is a diagrammatic view of a modified form illustrating mirrors as deflecting surfaces.

Figure 6 is a diagrammatic view illustrating the oppositely moving prism.

Figure 1:
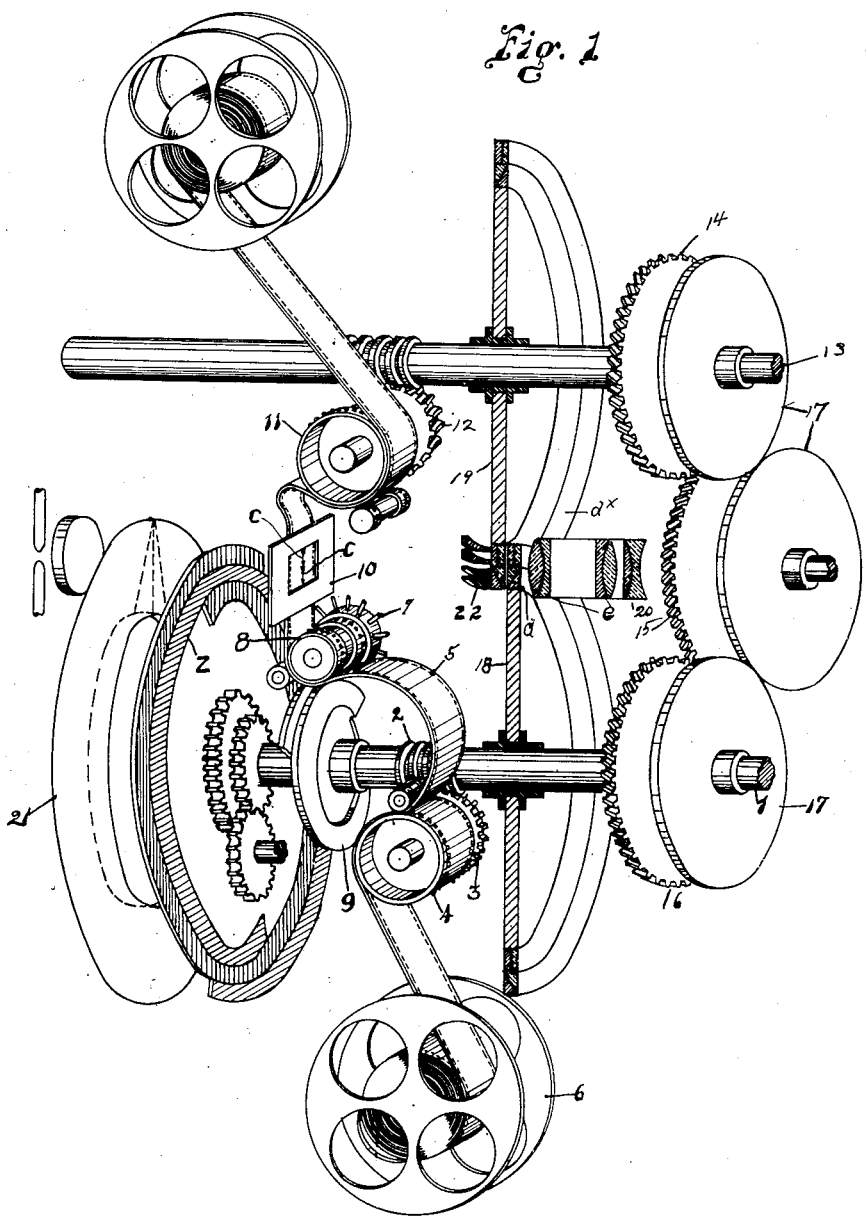
Figure 1 is a conventional illustration of my improved projecting machine.

In the drawings I have conventionally illustrated several parts entering into my invention and for the purpose of clearness have omitted an enclosing housing, supports for shafts, etc., but it is understood that these and other accessories, necessary to successfully practice my invention, should all be present.

1 indicates a shaft which is rotated from some suitable source of power, said shaft driving a worm 2 meshing with a worm-gear 3 conjoined to a delivery sprocket 4 over which the film 5 passes on its way to a take-up reel 6.

9 indicates a feeding cam in the form of a spiral having its ends overlapping and which cam operates with the pins or projections of sprocket 7 which is connected with a feed sprocket 8.

The film 5 passes an opening commonly called the aperture, in a plate 10, which opening or aperture is of such size as to accommodate one or more pictures at the same time. In the mechanism illustrated in the accompanying drawings, the aperture is of the size to accommodate two pictures. The film is fed from the primary reel over a feed sprocket 11 which latter is driven by means of a worm gear 12. Shaft 13 is geared to shaft 1 by means of suitable gearing. I have shown the connecting train to consist of three gear wheels 14, 15 and 16, the first being mounted on shaft 13 and the last on shaft 1, and to which gears are conjoined rollers 17, the ratios of whose diameters are equal to the ratios of the pitch diameters on said gears. The purpose of this is to enable the gears to run smoothly and noiselessly and to establish as far as practicable a perfect synchronism and fixed phase relation in the rotation of the shafts 1 and 13. It is obvious that there are other ways of securing synchronism and fixed phase relation in the rotation of these shafts.

In order to full understand the action of prisms in refracting or reflecting rays of light, as I propose utilizing reflection or prismatic deflection, I will refer to Figure 2 in which $a$ indicates a source of light,
$b$ the usual condensing lenses,
$c$ the picture to be projected,
$d$ the deflecting prism,
$e$ the objective lens or system of lenses,
$f$ the image thrown on the screen.

By examination of this figure, it will be seen that the rays of light are condensed onto the prism $d$, are there deflected and after passing through the objective lens or system of lenses, the picture is reproduced, enlarged (and inverted) on the screen.

From an examination of the diagram shown in Figure 2 it will be observed that a change in the power of the prism $d$ would cause a change in the position of the picture on the screen $f$. This is the fundamental principle of my present invention and a fact of which I take advantage by changing the power of the prism at the time that the picture $c$ is moving, to maintain the image on the screen stationary so that I am thus enabled to dispense with the use of a darkening shutter.

Referring now to Figure 3 in which I have shown a prism of varying power, it will be observed that at the right hand end $d^1$, where the faces of the prism are almost parallel to each other, said prism is of relatively lower power, while at the other end $d^2$ the angularity between the faces of the prism has been increased and the prism at this end may be said to be of high power, it is therefore a prism of varied strength. If such a prism were arranged to slide longitudinally between the picture and objective lens, assuming for the moment that the picture was stationary, it is obvious that the image on the screen would be raised or lowered by the varying deflecting powers of the said prism. So likewise will it be noted that if, at the time of moving the prism, the picture c was likewise moved, the speed of movement being proportionate to the speed of movement and the deflective powers of the prism, the image on the screen could be maintained stationary.

The changing angularity of the prism with respect to the picture would have a tendency to deflect opposite edges of the picture unequally, with the result that the picture would be askew on the screen. It is, therefore, necessary to correct the aberration of the prism which produces such a distortion and this is done by means of a correcting prism $d^x$ which is arranged in juxtaposition to the prism $d$. This correcting prism has its varying powers inversely arranged with respect to the prism $d$ with the result that the deflected rays of light are caused to pass through the two prisms in proper relation to each other so that the image is reproduced on the screen without being distorted or possessing the aberration above referred to.

It is, of course, obvious that if the prism $d$ is moving in the direction of the arrow shown in Figure 3, the prism $d^x$ would have to be moved in the reverse direction as shown by its arrow.

In view of the difficulties encountered in mechanically operating straight prisms, I prefer to revolve said prisms, but this operation brings in another aberration due to the curvature of the prisms which curvature must be compensated for and corrected, otherwise a distortion and vibration of the image on the screen would result.

As shown in Figure 4, the prism $d$ is curved about its axis of movement as its center while the prism $d^x$ has an opposite curvature about its axis of movement as a center, the two operative portions of prisms $d$ and $d^x$ overlapping, with the result that the lenticular formation of the two opposing curved surfaces will correct or neutralize the aberration which otherwise would be produced by the curvature of one prism.

In the apparatus shown in Figure 1, the prism $d$ is mounted on a wheel 18 secured to shaft 1, while the prism $d^x$ is mounted on the wheel 19 secured to shaft 13, the prisms thus being caused to move in opposite directions at their point of intersection.

While I prefer to revolve both the prisms $d$ and $d^x$ as above I may in some cases revolve only one of them placing such of the opposing corrections as are desirable on the other which would then remain stationary.

The wheels 18 and 19 carry the prisms $d$ and $d^x$ respectively, and, as shown in Figure 6, and for purposes of explaining my present invention, I will assume that these prisms are spiral in form as well as varied in strength. The end $d^1$ of prisms $d$ is of low power while the end $d^2$ is of high power, whereas with respect to the prism $d^x$ on wheel 19 the end $d^{xx}$ is of low power, while the end $d^{xxx}$ is of high power. In this manner, as the wheels 18 and 19 rotate in the direction of their arrows, the picture, when it is first brought into view, will be projected by the low power portions of the prisms and superposed in correct registration upon the image passing from view with the result that the lowermost picture passes from view and the overlapping ends of the prisms are rotated so that but one picture will be projected onto the screen and the image held stationary by the moving prisms whose angular powers so deflect the rays of light as to hold the image on the screen stationary, notwithstanding the fact that the film containing the picture is moving.

In operation, assuming that the first picture on the film is going into view, the revolution of the wheels 18 and 19 will pick up said first picture, first with the low power prisms, and as said picture descends the changing angularity of the prisms will hold the image stationary on the screen until extinguished by any suitable dissolver or shutter. It will be seen that at no time in the exposure of a film is light entirely cut off from the screen, but on the contrary, the same strength of light is at all time maintained upon the screen, except of course as the light value may be changed by pictures on the film.

The chromatic aberrations of the prisms should be corrected and it is my intention to correct them in the usual manner in which lenses are corrected for chromatic aberrations, to wit, use glasses of different refractivities and balancing dispersions, which method of correcting aberrations is well known to those skilled in the art as applicable in a moderate amount of correction, but for very fine corrections, the apochromatic system may be employed.

The cross sections of the prisms $d$ and $d^x$ clearly show such a structure, they being composed of two prisms of opposite angles one of which would ordinarily be crown and the other flint glass.

In order to use prisms of moderate powers and strength, it is highly desirable that the prisms should be as far as possible away from the picture, but in doing this it gets the prisms so far away from the pictures as to require objective lenses of long focal length; but long focal length lenses will project images that are so small as to be impracticable. To overcome this difficulty, I introduce a negative lens system 20, that is, lenses of negative power in front of the objective system of lenses $e$, thus magnifying the image on the screen and producing a lens system of asymmetrical focal lengths in a manner very similar to that used in the telephoto system of lenses.

To insure register and focus of the images on the screen, it is obvious that any suitable means can be employed, many of which are well known, to adjust the lenses and the prisms relative to each other, or to the film, and it is immaterial whether this adjustment with respect to the film involves a movement of the film, or of the prisms or the lens system.

In order to avoid "travel ghosts", that is variations of light on the screen, I arrange a prism 21 (see Figure 1), between the source of light and the film, whereby the rays of light are kept uniformly centered on the portion of the film being exposed. This prism 21 is preferably concentric in form and varies in strength proportionate to the movement of the film.

My invention also contemplates using reflecting mirrors which may be in the form of spirals completely encircling the wheel or sections of spirals above referred to, this system being illustrated in Figure 5 wherein there is shown, diagrammatically, a contemplated arrangement wherein spiral reflecting mirrors are employed, and in this figure I have designated the source of light as $a$, condensing lenses as $b$, the picture to be projected as $c$, the objective lens or system of lenses as $e$, and the image thrown on the screen as $f$. $x$ is the first mirror of the system, and $y$, the second mirror. The mirror $x$ is arranged in spiral form in a manner similar to the prisms $d$, heretofore described, and it is obvious that the aberration resulting from curvature of the mirror $x$ will be corrected by an opposite curvature of the mirror $y$. One of these mirrors $x$ or $y$ is mounted on the exterior of a wheel and is thereby given a positive curvature, whereas the other mirror is mounted on the interior so as to have an opposite or negative curvature to correct the positive curvature of the first mentioned mirror.

It is obvious that instead of having a single spiral either in the prism arrangement or the arrangement of the mirrors wherein said prisms or mirrors overlap their spiral ends slightly to temporarily expose two pictures at the same time, the aperture in the plate 25 could be made of such size as to accommodate two or more pictures at once, and the spiral prism or mirror continued to make a double spiral or a spiral of two or more turns, whereby two or more images may be projected on the screen continuously. This construction and the construction of the single spiral above referred to is, of course, applicable for use in connection with color transparencies commonly employed in conjunction with the well known colored picture projecting machine. These color screens would be arranged preferably in spiral form in a similar manner to the deflectors diagrammatically shown in Figure 1, the different colors being separated from each other for reasons which are obvious. I have indicated these color screens as $z$ in Figure 1. Where two or more color transparencies are employed they would have to be separate from each other, either in the form of two or more spirals commonly known as a multiple spiral, there being a transparency of a different color in front of different pictures.

While I have shown my apparatus as operating continuously, that is, that the pictures are moved past the aperture in the plate 25 non-intermittently, it is obvious that if desired, an intermittent feed could be employed, in which event the prisms would be in action during the feed movement of the film, but when the film is stationary the prisms could either remain stationary, or their power could be made uniform, or said prisms could be cut away entirely. This same operation would obtain with respect to the mirror construction shown in Figure 5.

In using the word "picture" or "film" in the accompanying claims, it will be understood that these words or either of them mean either a film transparency with a picture thereon, or an opaque sheet or strip as paper with a picture thereon, printed matter, diagrams, charts, etc.

When the term "deflect" is employed, it is to be understood as meaning deflection produced by surfaces which will deflect, refract or diffract, or other means of deviating a ray of light.

It will be seen that during the revolution of the wheels 18 and 19 there is a moment when two pictures are simultaneously projected in registry upon the screen, this of course would produce a flashing or change in illumination during this overlap. In order to avoid this flashing some means of dissolving the light must be provided such as the conventional finger dissolver commonly used in dissolving stereopticons. Such a dissolver is conventionally shown in Figure 1, at 22. By the use of this dissolver the total illumination is kept uniform during the transition period.

Having now described my invention I wish to claim—

Claims:

1. In an apparatus of the character described, the combination with means for feeding a picture strip and a source of light, of a system of lenses, a movable spiral prism of varying strength, in optical alignment with the picture on the strip that is to be exhibited and the lenses, and means for synchronizing the movement of the picture strip and the prism.

2. In an apparatus of the character described, the combination with means for feeding a picture strip and a source of light, of a system of lenses, a movable achromatic spiral prism of varying strength in alignment with the picture to be exhibited and the lenses, and means for synchronizing the movements of the picture strip and the prism.

3. The combination stated in claim 2 when the movable prisms are of spiral formation.

4. In an apparatus of the character described, the combination with means for feeding a picture strip and a source of light to which the picture strip is exposed, of a system of lenses, a movable spiral prism of varied strength, and means for dissolving the images projected from the strip, the said prism and dissolving means being in optical alignment with the picture to be exhibited and the lenses, and means for synchronizing the movements of the picture strip, the prism and the dissolving means.

5. In an apparatus of the character described, the combination with means for feeding a picture strip and a source of light to which the picture strip is exposed, of a system of lenses, a plurality of movable, oppositely arranged spiral prisms of varied strength, means for dissolving the images projected from the strip, the prisms and dissolving means being in optical alignment with the picture to be exhibited and the lenses, and means for synchronizing the movements of the picture strip, the prisms and the dissolving means.

6. In an apparatus of the character described, the combination with means for feeding a picture strip and a source of light, of a system of lenses, a movable prism of varied strength, means for projecting the image of the oncoming picture with gradually increasing intensity and for simultaneously and gradually extinguishing the image of the outgoing picture, and means for synchronizing the movements of the picture strip, the dissolving means and the prism.

7. In an apparatus of the character described, the combination with means for feeding a plurality of movable pictures whose images are to be projected, of a system of lenses, a plurality of movable prisms of varied strength and different refractive powers, which register a plurality of images on a screen and hold them stationary during the movement of said pictures, and means for admitting and shutting off rays of light to and from the pictures the said several moving parts having their movements synchronized with reference to each other.

8. In an apparatus of the character described, the combination with a holder for a movable picture whose image is to be projected onto a screen and a source of light, of a system of lenses, a movable prism of varied strength interposed between the picture and the screen for locating the image of the picture upon the screen, a second, correcting, prism of different refractive power arranged to receive the light from the first prism and transmit it to the screen so as to correct chromatic aberrations, and means for synchronizing the movements of the picture and the said two prisms.

9. In an apparatus of the character described, the combination with a holder for a movable picture whose image is to be projected onto a screen and a source of light, of a system of lenses, a movable spiral prism arranged between the picture and the screen for locating the image of the picture upon the screen, a second prism of different refractive power arranged to correct chromatic aberrations produced by the first mentioned prism, and means for synchronizing the movements of the picture and the said two prisms.

10. In an apparatus of the character described, the combination with means for moving a picture strip to be projected onto a screen and a source of light, of a system of lenses, a movable prism of varied strength spiralled about its axis of movement and having a portion thereof in optical alignment with the lenses, the prism being located between the picture and the screen and operating to locate the image of the picture upon the screen, and means for synchronizing the movements of the picture and the prism.

11. In combination, means for feeding a picture strip having a plurality of pictures thereon to be projected upon a screen, a source of light and a system of lenses for projecting images of the pictures upon the screen, means operated in synchronism with the strip feeding mechanism for maintaining the images stationary upon the screen while the corresponding pictures pass the projecting system, and means for projecting the image of the oncoming picture upon the screen with gradually increasing intensity and for simultaneously and gradually extinguishing the image of the outgoing picture.

12. In combination, means for feeding a picture strip having a plurality of pictures thereon to be projected upon a screen, a source of light and a system of lenses for projecting images of the pictures upon the screen, means operated in synchronism with the strip feeding mechanism for maintaining the images stationary upon the screen while the corresponding pictures pass the projecting system, comprising a spiral prism having varying strength throughout its length and having overlapping ends, whereby the images of both the oncoming and the outgoing pictures are simultaneously projected upon the screen while the overlapping ends of the prism pass the projecting system.

13. In combination, means for feeding a picture strip having a plurality of pictures thereon to be projected upon a screen, a source of light and a system of lenses for projecting images of the pictures upon the screen, a spiral prism having overlapping ends and varying strength throughout its length arranged in the path of the images, means for rotating the prism in the path of the images in synchronism with the strip feeding mechanism for maintaining the images stationary upon the screen while the corresponding pictures pass the projecting system, and light filtering means associated with the overlapping ends of the prism for simultaneously gradually increasing the intensity of the image of the oncoming picture and decreasing the intensity of the outgoing picture.

In testimony whereof I have hereunto affixed my signature this 2nd day of December, 1919.

PENROSE E. CHAPMAN.